United States Patent Office 2,967,046
Patented Jan. 3, 1961

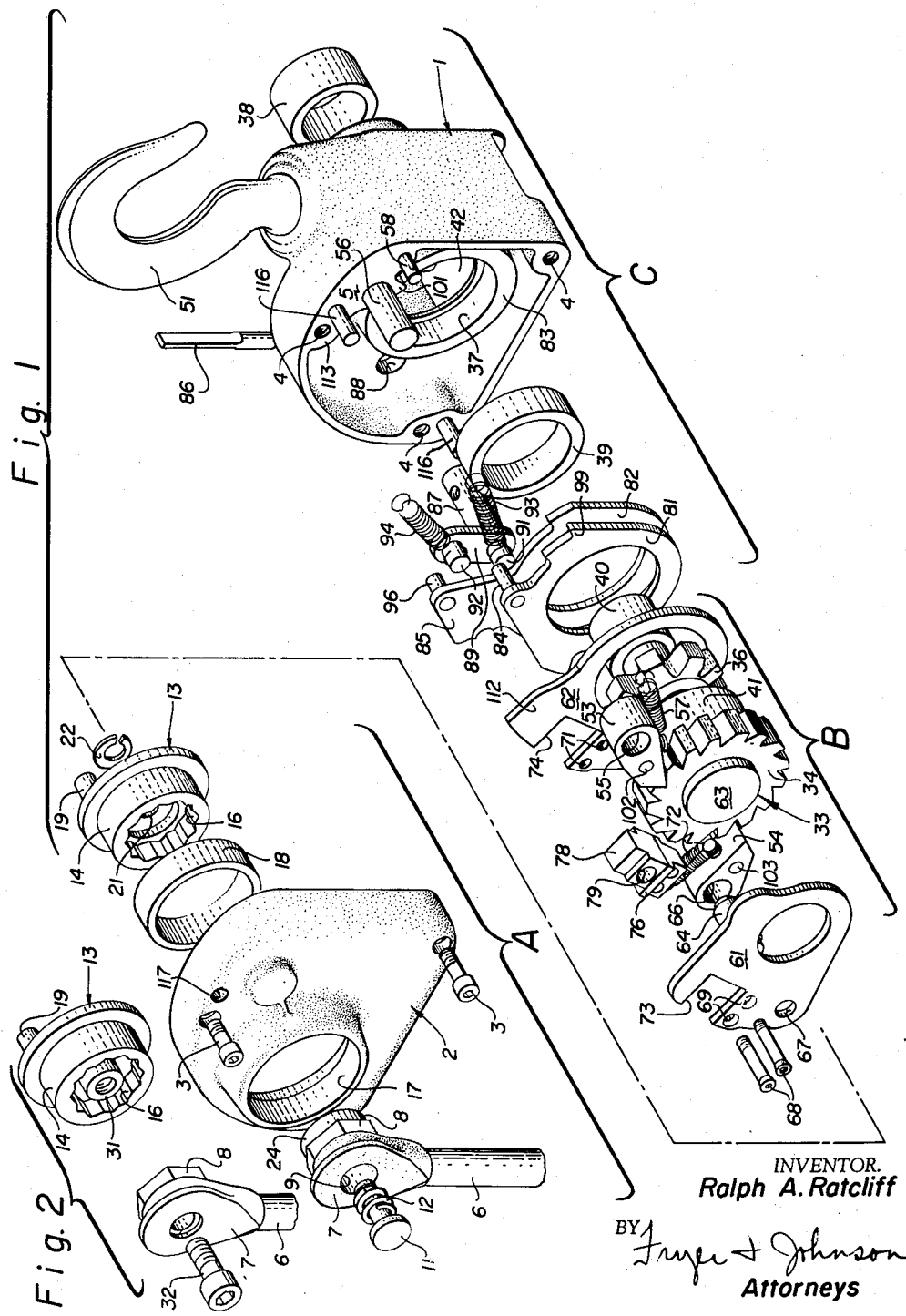

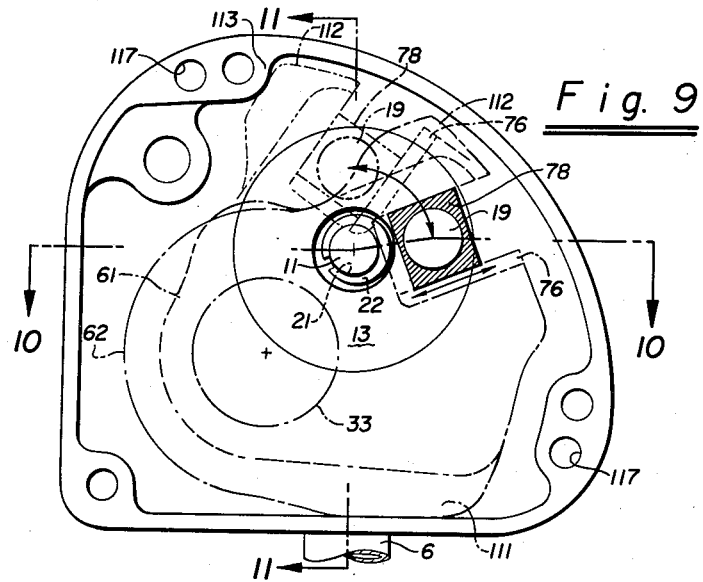
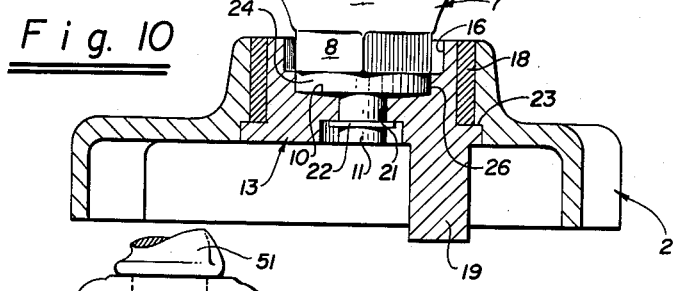
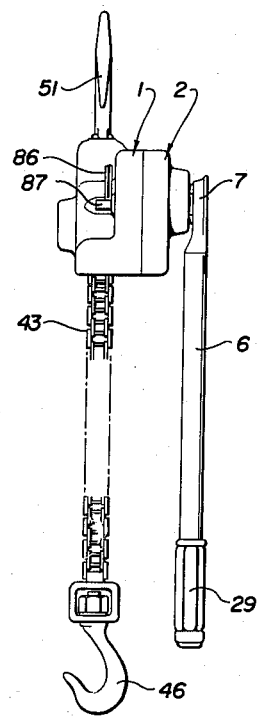
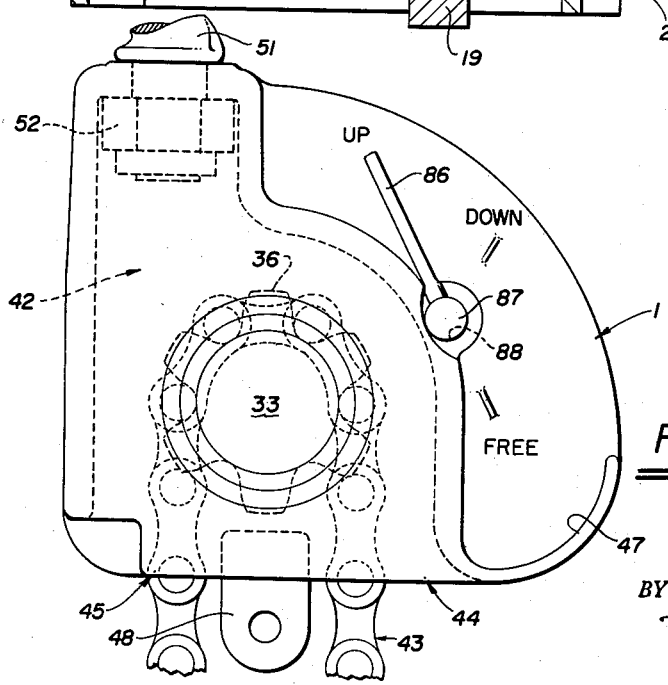

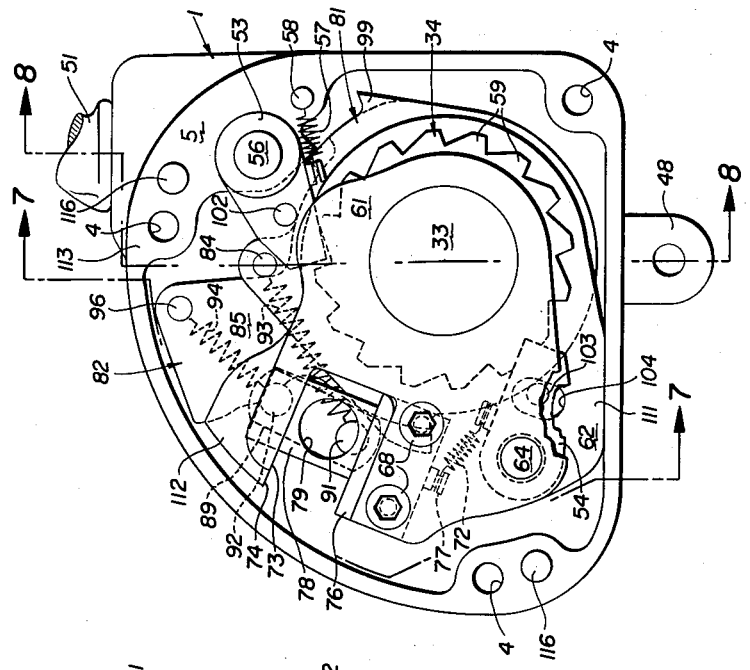
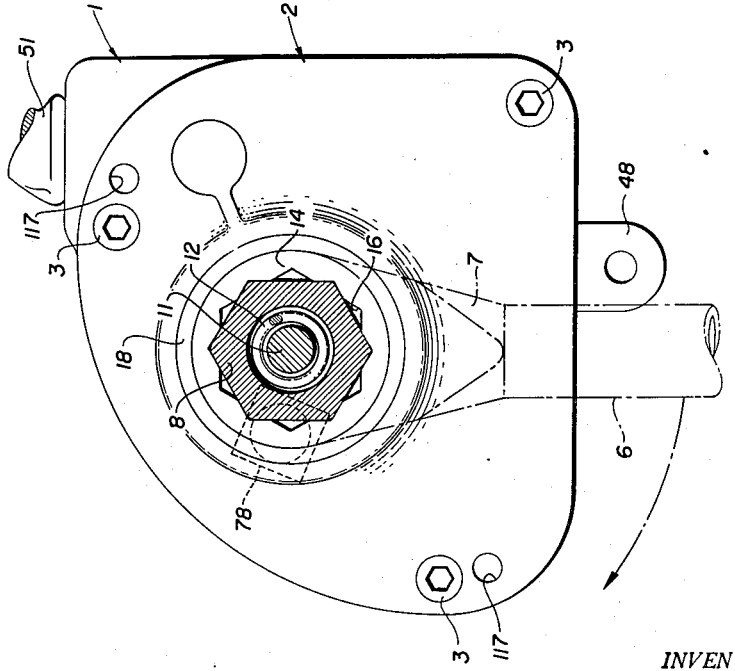

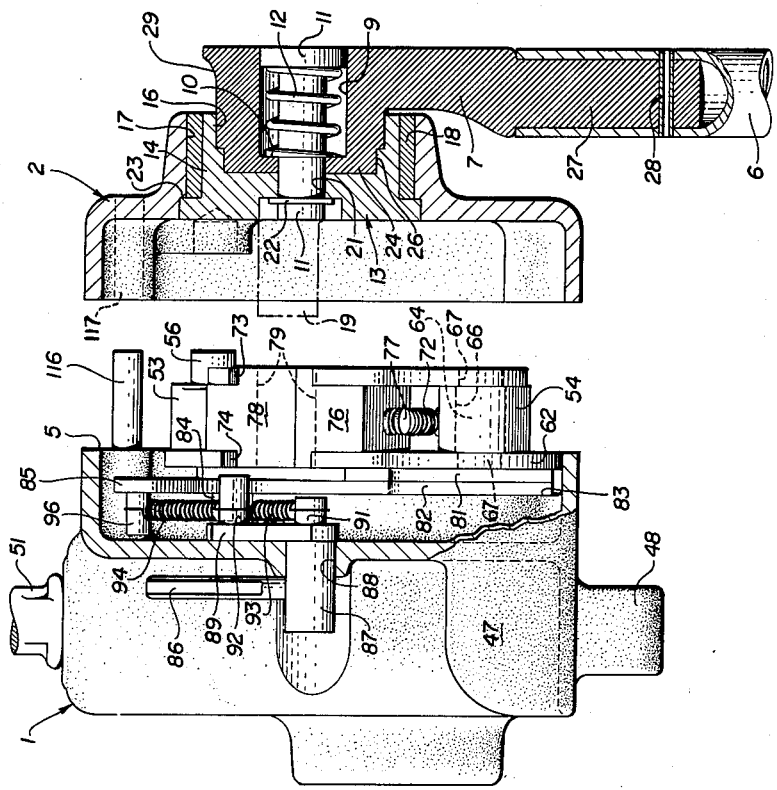

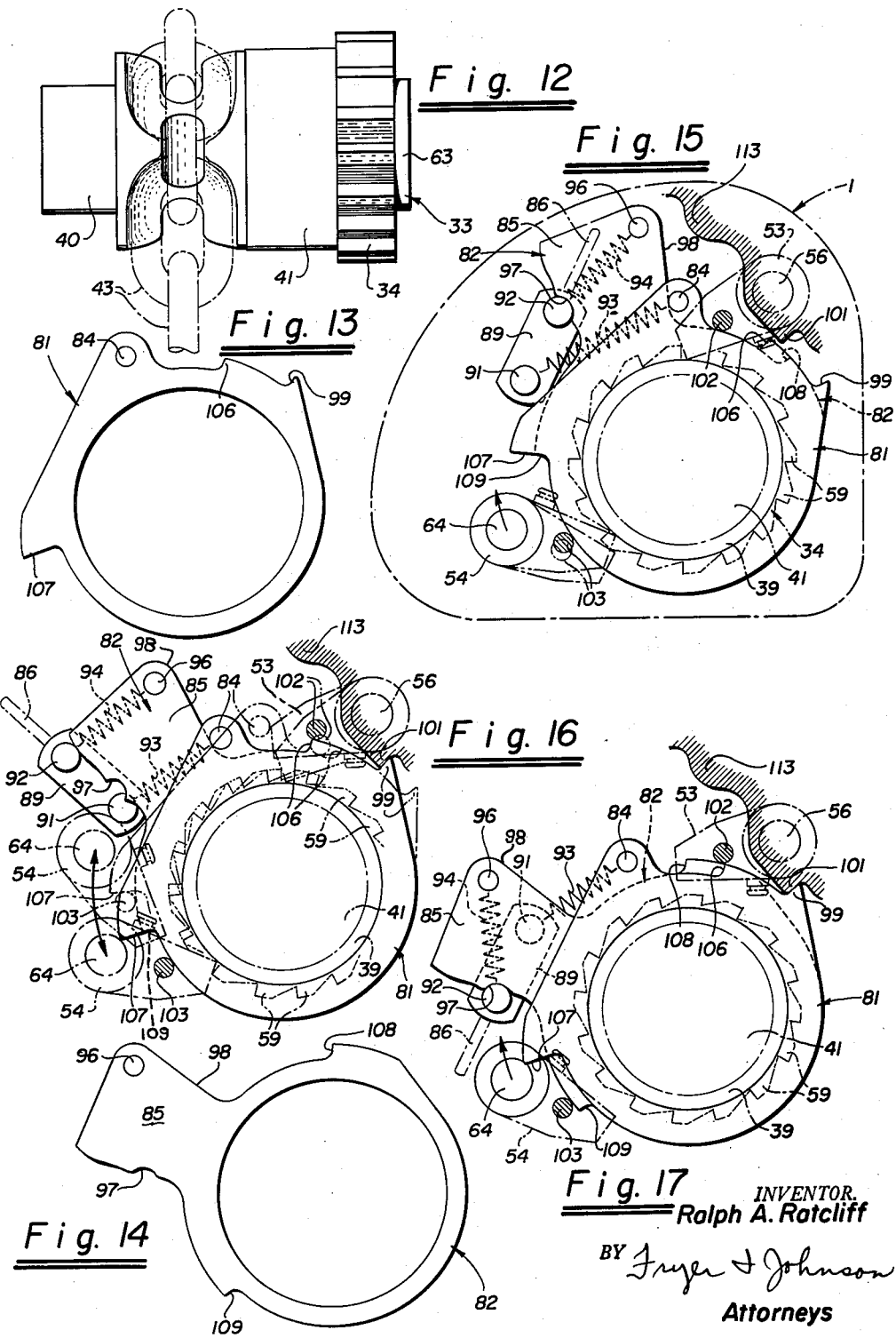

2,967,046

LOAD BEARING DEVICE

Ralph A. Ratcliff, 1300 Sunnyslope Ave., Belmont, Calif.

Filed May 4, 1959, Ser. No. 810,695

22 Claims. (Cl. 254—167)

This invention relates generally to load bearing devices which are capable of raising or lowering loads in a predetermined controlled manner or are capable of applying tension to hold down elements for maintaining a load in predetermined position on a transporting vehicle or the like. While the invention relates primarily to hoist type devices, the same also may be suitably employed in load binding devices or the like.

More particularly, the invention relates to a light weight, portable load lowering or raising hoist of the pawl and ratchet type as opposed to the so-called friction brake type. Such hoists are frequently used by utility maintenance linemen and the like. While the hoist of the present invention is intended primarily to be employed with chain type load bearing elements of various sizes and types, other load supporting elements such as metal cables and the like also may be suitably employed therewith.

Pawl and ratchet type hoists have been known generally in the art heretofore but such prior art hoists have certain important deficiencies which are corrected by the present invention. For example, generally such prior art hoists require several operating controls or require that the operating handle thereof be located in a given position before up, down or free chain conditions can be obtained. That is, prior pawl and ratchet hoists do not have up, down and free chain conditions regulated by a single, simply operated control which is effective irrespective of the position of the operating handle.

Furthermore, any such prior art devices which produce a mechanical advantage upon operation of the operating handle generally do so by employing cumbersome and bulky gear or compression link arrangements. In addition, prior art hoists are capable of utilizing only one type of chain therewith. Finally, the operating handles of prior art devices are usable in only two operating positions at most.

Accordingly, objects of the present invention include the provision of a chain or like hoist which includes a multi-position operating handle; the provision of a hoist in which the load bearing sheave over which a chain or like element is passable is easily and readily removable from the hoist whereby a sheave of a different character may be substituted therefor so that chains or cables of different sizes and types may be employed with the hoist; the provision of a hoist in which up, down and free chain or free running conditions are incorporated for regulation in a single control irrespective of operating handle position; and the provision of a hoist in which a mechanical advantage is produced without resorting to compression links or gears whereby a compact hoist construction and an operating handle of minimum length may be employed to effect raising and lowering of a load with a minimum amount of effort on the part of a hoist operator.

These and other objects will become evident from the following description, in which reference is directed to the accompanying drawings for a further understanding of the invention.

In the drawings:

Fig. 1 is an exploded perspective view of the hoist illustrating the respective elements thereof and the relationship of such elements to each other.

Fig. 2 is an exploded view of an operating handle structure of a modified construction.

Fig. 3 is an end elevation of an assembled hoist illustrating its compact construction and attractive appearance.

Fig. 4 is an elevation of one side of the hoist casing illustrating the up, down and free chain control incorporated in a single lever and a chain element passing through the casing.

Fig. 5 is an elevation of the other side of the casing with part of the operating handle structure cut away to disclose the multi-position construction thereof.

Fig. 6 is a view similar to Fig. 5 with one-half of the casing removed to disclose the inner mechanism of the hoist with the control structure thereof in the up chain position.

Fig. 7 is a sectional view of the hoist mechanism taken in the plane of line 7—7 of Fig. 6.

Fig. 8 is a sectional view of the hoist mechanism taken in the plane of line 8—8 of Fig. 6.

Fig. 9 is a side elevation of the hoist casing section to which the operating handle structure is connected which illustrates in phantom lines the mechanical advantage producing sliding cam arrangement.

Fig. 10 is a sectional view taken in the plane of line 10—10 of Fig. 9 illustrating details of the operating handle structure.

Fig. 11 is a section of the casing section of Fig. 9 taken in the plane of line 11—11 thereof.

Fig. 12 is an elevation of a modified type of load bearing sheave interchangeably usable with the hoist raising and lowering mechanism.

Fig. 13 is a plan view of the reverse control ring of the hoist control structure.

Fig. 14 is a plan view of the free chain control ring of the hoist control structure.

Fig. 15 is a more or less schematic view of the control structure in the operative up chain condition for raising a load.

Fig. 16 is a schematic view of the control structure in the operative down chain condition for lowering a load.

Fig. 17 is a schematic view of the control structure in the operative condition for obtaining free chain.

As noted previously, although this invention desirably is embodied in a hoist type load bearing device, the respective mechanisms thereof are equally well adapted for use in other types of load bearing devices, such as, for example, load binders used in the logging or similar industries for maintaining logs or other loads on a transportation vehicle. Other suitable and varied functions also may be performed by this invention. Accordingly, as used herein, "hoist" is intended to include other related load bearing devices also.

In the hoist embodiment illustrated in the exploded view in Fig. 1, the construction disclosed may be divided broadly into three sub-assemblies mountable in or on a two piece, separable hoist casing. Such assemblies include; (A) an operating handle structure mounted on one casing section; (B) operating mechanism cooperative with the handle structure and operative to effect raising or lowering of a load in a predetermined controlled manner; and (C) control structure part of which is mounted on the other casing section for regulating operation of the operating mechanism.

The hoist housing or casing is comprised of two parts including a main casing section 1 in and on which the operating mechanism and control structure of the hoist is mounted, and a removable casing cap section 2 which may be secured by any suitable fastening means to casing section 1. In the embodiment illustrated, a plurality of cap screws 3 receivable in threaded bores 4 provided in face 5 of the main casing section 1 are employed to maintain the casing sections assembled.

Operating handle structure

The operating handle structure of the hoist is mounted on cap section 2 and includes an operating handle 6 connected with handle boss section 7 which has extending therefrom a polygonal projection 8. Handle boss 7 is provided with a through bore 9 including an internal spring seat shoulder 10 (see Fig. 11). A headed detent pin 11 about which is positioned a coil spring member 12 is slidably mountable in bore 9. When the handle structure is assembled, spring 12 seats on bore shoulder 10 and the underside of the head of pin 11. See Fig. 11.

The operating handle structure also comprises rotatable disc member 13 which includes a reduced diameter cylindrical projection 14, the interior of which defines a multi-point star socket 16 adapted to receive the multi-point polygonal projection 8 of the handle boss 7. Cap section 2 of the hoist casing is provided with a stepped through bore 17 (Fig. 11) in which a bearing ring 18 is non-rotatably positioned and in which the cylindrical projection 14 of disc member 13 is rotatably mounted.

Extending from disc member 13 in a direction opposite from cylindrical projection 14 is a cylindrical operating arm or pin 19 which is offset relative to the axis of disc member 13 so that rotation of the disc member about its axis produces attendant rotation of the pin 19 concentrically about such axis. Disc member 13 also is provided with a stepped through bore 21 co-axially arranged with the axis of star socket 16 so that detent pin 11 may be extended through the disc member. Desirably detent pin 11 is provided with an annular groove (not shown) adjacent an end thereof in which is engageable a split retaining ring 22 or like fastener. Ring 22 (Fig. 11) maintains handle 6 securely united with socket 16 but allows the position of the handle relative to the socket to be modified by overcoming the urging effects of coil spring 12.

Interengagement of the operating handle boss 7 with star socket 16 of disc member 13 is illustrated in detail in Figs. 5 and 9–11. As Fig. 5 shows, multi-point star socket 16 desirably comprises twelve internal points, while handle boss projection 8 is of hexagonal external configuration which includes six points engageable in any one of twelve predetermined positions with the star socket. While such an arrangement has proved highly effective, other suitable socket and projection constructions also may be utilized as desired. The twelve position handle arrangement allows the hoist operator to position handle 6 in the position most convenient to him for operation. This feature is important, for example, when the hoist is used in inverted position by a utility lineman working on a utility pole or the like.

As shown in Figs. 10 and 11, disc member 13 is engaged with an internal shoulder 23 of housing bore 17 and the inner end of bearing 18 so that the disc member is precluded from inadvertent movement outwardly from casing cap section 2. Desirably a cylindrical extension 24 is provided on boss projection 8 which is receivable in a cylindrical extension 26 of star socket 16 which communicates with disc member bore 21 to facilitate proper location of the projection 8 in the star socket.

As Fig. 11 illustrates, desirably operating handle 6 is of hollow construction and is formed separately from boss 7 for ease of manufacture and is slidably inter-engaged with an end portion 27 of the boss. Any suitable fastening means, such as a hollow drive pin 28, may be employed to effect union of the handle to the boss. Handle 6 may be formed from any suitable material, such as commercially available light weight but strong steel pipe. A rubber handle grip 29 (Fig. 3) may be provided on the end of handle 6.

Handle 6 is spring loaded by coil spring 12 so that the position of the polygonal multi-point projection 8 with the multi-point star socket 16 may be readily and easily modified merely by pulling outwardly on the handle boss 7 against the urging of coil spring 12. Compression of spring 12 permits projection 8 to be completely disengaged from the star socket without handle 6 being separated from disc member 13. As a result, handle 6 may be re-oriented in any convenient position in the star socket so that the handle may be conveniently used by the hoist operator regardless of orientation of the hoist. For example, if the hoist is to be used in the inverted position, the operating handle 6 may be re-positioned to extend diametrically opposite from its positioning in Fig. 3. To facilitate grasping of handle 7 to withdrawn projection 8 from star socket 16, boss 7 is desirably undercut as at 29 (Figs. 10 and 11).

Fig. 2 shows a modified operating handle construction in which handle 6 is not spring urged and is somewhat more securely engaged in star socket 16. In the modification of Fig. 2, an internally threaded projection 31 is provided in star socket 16 which is intended to enter the bore through handle projection 8 and to removably receive therein a threaded fastening member such as bolt 32 of any suitable type. To modify the positioning of projection 8 with socket 16, bolt 32 is disengaged from projection 31 an amount sufficient to allow withdrawal of the polygonal projection 8 from the star socket 16 so that handle 6 may be rotated relative to the socket before the same is reengaged therewith.

Pawl and ratchet operating mechanism

The operating mechanism is of a pawl and ratchet type which permits raising or lowering of a load in step by step fashion without danger of accidental dropping of the load. Such mechanism includes a shaft 33 on which are spacedly and non-rotatably positioned a ratchet wheel 34 and a chain sheave 36. In the embodiment illustrated chain sheave 36 is of the type adapted to receive thereover a roller type chain of a predetermined size. However, as will be described hereinafter, th hoist of this invention also is usable with coil type chain or other load supporting elements, such as metal cables and the like, depending upon the type of sheave employed.

As best shown in Fig. 8, shaft 33 is rotatably mounted in stepped bore 37 extending through main casing section 1. Bearing ring members 38 and 39 are closely fitted in the spaced bore sections and enlarged shaft bearing sections 40 and 41 are engaged in the bearing rings whereby the shaft 33 and ratchet wheel 34 and sheave 36 thereon are rotatable within the housing. It should be noted that shaft 33 is slidable longitudinally of casing bore 37 so that sheave 36 thereon may be easily changed when casing cap section 2 is removed.

Housing section 1 is internally provided with a hollow sheave receiving portion 42 in which sheave 36 is rotatable (Figs. 4 and 8). It is in such hollow portion 42 that a chain 43 is movable with opposite reaches of the chain passing through channels 44 and 45 provided in the bottom of casing section 1. As shown specifically in Fig. 4, casing section 1 is designed so that a chain passing over sheave 36 cannot be accidentally disengaged from the sheave in that the spacing between the casing interior and the sheave periphery is devised to preclude such disengagement regardless of the type of chain or cable employed with the hoist. As a result, several types and sizes of chain or the like may be advantageously employed in the same casing. A hook 46 is provided on one chain end on which a load may be supported as shown in Fig. 3. Casing section 1 is provided adjacent passage 44 with a smoothly curved guide rail section 47 over which the chain may smoothly travel when the hoist is supported in the inverted or other non-conventional position by hook 46. Note Figs. 4 and 7 in this respect.

An apertured boss 48 is provided on the bottom of housing section 1 between passages 44 and 45 so that an end of the chain may be connected thereto in any suitable manner so that the hoist may be used in a block and tackle type assembly. Connected to the upper portion of housing section 1 is a conventional mounting hook 51. Hook 51 may be maintained in engagement with the housing by means of nut member 52 as shown in Figs. 4 and 8.

In the absence of any restraining means, shaft 33 is free to rotate in either a clockwise or counterclockwise direction as viewed in Figs. 1, 6 and 15-17 of the drawings. As used hereinafter, clockwise rotation of the shaft and ratchet wheel and sheave thereon results in a load on hook 46 being lowered while counterclockwise rotation thereof results in a load being raised. Upon rotation of shaft 33 in a given direction, chain 43 passing over the sheave 36 on the shaft will move in the same direction to raise or lower the load as described. To regulate rotation of sheave 36 so that the load may be moved in a predetermined controlled manner, suitable pawl means are provided for engagement with the ratchet wheel 34.

As Fig. 1 shows, two such pawls are employed and include a holding pawl 53 and an operating pawl 54. Each of the pawls is positioned in the casing in line with ratchet wheel 34 and is normally engaged therewith. Holding pawl 53 includes a transverse mounting bore 55 and is pivotally mounted above the ratchet wheel on a pin 56 extending from face 5 of casing section 1. Holding pawl 53 normally is spring urged into engagement with ratchet wheel 34 by means of coil spring 57 secured at one end to the pawl with the other end thereof engaged over spring anchoring pin 58 on housing face 5. As a result of the spring urging of pawl 53, when the parts are assembled into a completed hoist, rotation of ratchet wheel 34 and also sheave 36 in a clockwise direction normally is precluded.

However, because each of the teeth 59 of the ratchet wheel has an inclined surface, rotation of the wheel in a counterclockwise direction is not precluded by holding pawl 53 in that the pawl is free to ride over the inclined surfaces of teeth 59. In such manner chain 43 may be freely run through the hoist in a counterclockwise direction if no load is on hook 46. While any suitable number of teeth may be employed on the ratchet wheel, desirably sixteen such teeth have been found suitable. The mounting of holding pawl 53 in operative position in the hoist is shown in Figs. 6-8.

Operating pawl 54 also is pivotally mounted relative to ratchet wheel 34 so that the same is free to ride over ratchet teeth 59 during counterclockwise rotation of the ratchet wheel but is capable of restraining rotation of the wheel in a clockwise direction. Desirably, the operating pawl is mounted between a pair of generally similar ratchet plates 61 and 62 which are rotatably mounted on shaft 33 (Figs. 7 and 8). When assembled, ratchet plate 61 is rotatable on a reduced end portion 63 of the shaft while ratchet plate 62 is mounted on enlarged bearing surface 41 described previously in contact with the end of bearing ring 39.

A suitable mounting or pivot pin 64 is positionable through a transverse mounting bore 66 of operating pawl 54 with opposite ends of pin 64 being engaged in suitable receiving holes 67 in the respective ratchet plates as shown in dotted lines in Fig. 7. As a result, operating pawl 54 is oscillatably mounted on pin 64 relative to ratchet plates 61 and 62 and is pivotable independently of such plates. Ratchet plates 61 and 62 are secured together by suitable screw fasteners 68 passing through holes 69 in plate 61 and threadably received in threaded holes 71 in plate 62. See Figs. 1 and 6. In such manner the plates are secured on opposite sides of and in engagement with ratchet wheel 34, but are rotatable relative thereto.

A coil spring 72 is connected at one of its ends to operating pawl 54 mounted between the ratchet plates for normally urging such pawl into engagement with ratchet wheel teeth 59 as shown in Fig. 6.

As shown in Figs. 1 and 6, each of ratchet plates 61 and 62 is provided with a rectangular cut out portion, numbered 73 and 74 respectively. A transversely apertured and generally T-shaped base block 76 is engaged between plates 61 and 62 with the head of the T engaged with the lower edges of such cut out sections. Base block 76 is maintained between ratchet plates 61 and 62 by the threaded fasteners 68 mentioned previously which pass through apertures provided in such base block. It is to a pin 77 extending from the bottom of base block 76 that the opposite end of operating pawl coil spring 72 is anchored so that operating pawl 54 is normally urged into engagement with the ratchet wheel. Note Figs. 6 and 7. Other suitable means for anchoring coil spring 72 may be employed however.

Because operating pawl 54 is mounted between ratchet plates 61 and 62 which are rotatable relative to ratchet wheel 34, rotation of the ratchet plates produces attendant movement of the operating pawl. As a result, if the ratchet plates are rotated in a clockwise direction pawl 54 will ride over teeth 59 of the ratchet wheel. However, if the ratchet plates are forcibly rotated in a counterclockwise direction, engagement of the operating pawl with the ratchet wheel will produce attendant rotation of the ratchet wheel in a counterclockwise direction and will similarly cause rotation of sheave 36 in a counterclockwise direction.

Sliding cam arrangement

To effect rotation of ratchet plates 61 and 62 in a given direction so that operating pawl 54 is effective to rotate ratchet wheel 34 if so desired, a sliding cam arrangement is provided for operatively connecting ratchet plates 61 and 62 to the operating handle 6 described previously. Such cam connection includes a sliding cam member 78 slidably positioned between ratchet plates 61 and 62 and slidable on base block 76 as shown in Figs. 1, 6 and 7. Cam member 78 is of inverted T-shaped cross section and is snugly yet slidably received within the cut out portions 73 and 74 of the ratchet plates. A transverse bore 79 is provided through cam member 78 for receiving operating pin 19 of the operating handle structure described previously. By referring to Figs. 7 and 11, it is seen that operating pin 19 is slidably receivable in an endwise direction into bore 79.

When operating pin 19 is engaged in bore 79 of cam member 78, rotation of disc member 13 in a given direction in casing section 2 by rotating operating handle 6 will produce attendant sliding motion of cam member 76 in a generally radial direction relative to the axis of ratchet wheel 34 within given limits. Sliding movement of cam member 76 will produce rotation of ratchet plates 61 and 62 about the shaft 33 so that operating pawl 54 is caused to either ride over the teeth of the ratchet wheel or is effective to cause rotation of the ratchet wheel depending upon the direction in which operating handle 6 is moved.

As a result, a definite mechanical advantage is imparted to the hoist of this invention so that an operating handle of relative short length may be employed for lifting great weights. For example, in a hoist rated at one ton capacity, an operating handle only thirteen inches in length has been found highly satisfactory.

Heretofore mechanical advantages have been produced in pawl and ratchet hoists by means of inter-engaged gears or compression linkage arrangements. Such gear and linkage arrangements, however, in comparison to the present invention, are embodied in a comparatively bulky and cumbersome construction and of necessity are enclosed in hoist casings of undue size. In the present invention, however, because the sliding cam member is reciprocable within limits defined by the arc produced when the ratchet plates 61 and 62 are rotated as described herein, a markedly more compact and lighter weight arrangement is produced. That is, because cam member 78 is slidable on ratchet plates 61 and 62, the size of the housing is determined to a large extent by the length of the ratchet plates. No gears or compression links which extend beyond the free ends of the ratchet plates are required in producing a mechanical advantage. Accordingly, a simple construction results which is highly efficient and effective in producing a mechanical advantage.

Because of the compactness of the present hoist, as shown assembled in Fig. 3, a steel housing may be utilized without unduly increasing the hoist weight. The other parts of the hoist similarly may be made of high strength steel. Because of large housings required to enclose bulky prior art mechanisms of comparable lifting capacity, lighter weight and less strong materials, such as aluminum are extensively employed. While metals such as aluminum may be satisfactory, stronger steel is preferred.

Control structure

For controlling engagement of holding pawl 53 and operating pawl 54 in a predetermined manner with ratchet wheel 34 so that chain sheave 36 may be rotated in a given direction, suitable control structure is provided. Such control structure includes mechanism responsive to positioning of a single control member so that up, down and free chain control are all incorporated in such single member. This is in distinction to prior art pawl and ratchet type hoists in which a separate control member generally is required to obtain free chain or the like. Furthermore, the control structure of this invention is operative irrespective of and independently of the position of the operating handle 6 relative to the hoist casing. That is, the control structure may be moved into the free chain and like position without the hoist operator being concerned with the position of the operating handle and without requiring the operator to move the handle to a certain position as is also common with many prior art devices.

As shown in Fig. 1, control structure of this invention includes a pair of control rings 81 and 82, each of which has a generally circular outer periphery with predetermined projecting areas thereon as hereinafter described. Ring 81 is termed a reverse ring, while ring 82 is termed a free chain ring. Reverse ring 81 and free chain ring 82, as shown in Figs. 7 and 8, are rotatably mounted about bearing section 41 of shaft 33 on an extension of bearing ring 39 in which such section 41 is rotatable. Rings 81 and 82 under certain conditions are rotatable relative to each other, and when the hoist is assembled, ring 81 is positioned between ring 82 and ratchet plate 62. A smooth annular shoulder 83 is provided in the hoist casing section 1 against which free chain ring 82 is rotatable (Figs. 1 and 8). The exact configurations of rings 81 and 82 are shown in Figs. 13 and 14.

Extending toward free chain ring 82 from reverse ring 81 and connected with ring 81 is a motion transmitting pin 84. Such pin 84 engages a predetermined bulbous portion 85 of the periphery of free chain ring 82 so that movement of the reverse ring in a counterclockwise direction causes similar movement of free chain ring 82. Furthermore, upon movement of free chain ring 82 in a clockwise direction, the reverse ring also is so moved. As a result, the two rings are movable with each other within defined limits but are at the same time movable independently of each other if one of such rings is stopped.

Additional elements of the control structure are operatively connected with the respective control rings to effect movement thereof in a predetermined manner in response to movement of such additional elements. This portion of the control structure includes a control lever 86 positioned exteriorly of the main casing section 1 as shown in Figs. 3, 4 and 7. Such control lever is secured in any suitable manner to the end of a rotatable shaft 87 which extends through a bore 88 provided in the casing wall. A link 89 is secured at one of its ends to shaft 87 and extends generally parallel to control lever 86 but is separated therefrom by the casing wall. Pins 91 and 92 extend from opposite ends of link 89 and provide anchor points for a pair of coil springs 93 and 94 respectively. As shown in Fig. 7, pin 91 is a substantial continuation of shaft 87. Spring 93 is anchored at its other end to aforementioned motion transmitting pin 84 which extends from reverse ring 81. An anchoring pin 96 is provided on bulbous portion 85 of free chain ring 82 to which the other end of spring 94 is anchored.

Upon movement of control lever 86, rotation of control shaft 87 and movement of link 89 also is effected. Springs 93 and 94 normally urge control rings 81 and 82 towards link 89.

Referring to Fig. 15, when control lever 86 is in the up chain position, as shown in phantom lines, pin 92 engages a detent shoulder 97 (see Fig. 14 also), on free chain ring 82. Pin 91 is shorter than pin 92 and remains free of engagement with both control rings. Although spring 93 normally urges reverse ring 81 in a counterclockwise direction, the urging action of such spring is counteracted by control link pin 92 engaging detent shoulder 97. Reverse ring motion is precluded by engagement of pin 84 with peripheral surface 98 of the free chain ring bulbous portion 85.

When control lever 86 is moved to the central or down chain position shown in Fig. 16, link 89 is likewise pivoted to the central position in which pin 92 is freed from engagement with detent shoulder 97 of the free chain ring. In such position, springs 93 and 94 are relatively untensioned and control lever 86 is maintainable in such position without requiring a positive detent. In addition a limit stop 99 on the periphery of reverse ring 81 engages a cooperable limit stop 101 formed on the interior of the main casing section 1 (Figs. 1 and 15–17). Engagement of reverse ring limit stop 99 with casing limit stop 101 precludes movement of reverse ring 81 in the counterclockwise direction to any extent greater than that shown in Fig. 16 regardless of further counterclockwise movement of free chain ring 82 and the urging of spring 93. As a result, reverse ring 81 is rotatable between the positions shown in Figs. 15 and 16. However, further movement of control lever 86 to the lowermost or free chain position results in spring urged movement of free chain ring 82 to the position shown in Fig. 17 in which free chain ring 82 is moved counterclockwise until bulbous portion 85 thereof is freed of engagement with pin 84 on reverse ring 81.

Summarizing operation of the control lever 86, when the control lever is in the up chain (uppermost) position, detent shoulder 97 on free chain ring engages pin 92 on control link 89 and both rings are maintained in the position shown in Fig. 15. Movement of control lever 86 to the down chain (central) position produces attendant movement of the reverse ring and the free chain ring in a counterclockwise direction until the rings reach the position shown in Fig. 16. Further movement of the control lever to the free chain position (lowermost) results in movement of the free chain ring by itself to the lower position shown in Fig. 17. With the control lever 86 in the free chain position, the reverse ring is precluded from further counterclockwise movement by engagement with limit stop 101 formed on the interior of the casing.

Referring now to Figs. 1, 8 and 15 to 17, extending laterally from holding pawl 53 is a control ring engaging pin 102. Similarly extending laterally from operating pawl 54 is a control ring engaging pin 103. Because pawls 53 and 54 normally are spring urged into engagement with ratchet wheel 34, pins 102 and 103 normally engage the circular portions of the peripheries of the control rings. As shown in Fig. 6, pin 102 is positioned to extend above the spaced ratchet plates 61 and 62 and is free of contact therewith. However, because ratchet plate 62 has a bulbous lower portion, to be described presently, it is necessary to provide an access opening 104 through which operating pawl pin 103 may extend without interfering with reciprocation of ratchet plate 62.

As shown in Fig. 13, a cam shoulder 106 is provided on the periphery of reverse ring 81 which is engageable with holding pawl pin 102 in a manner to be described. Furthermore, a stop shoulder 107 also is provided on reverse ring 81 at a point substantially diametrically opposite from limit stop 99 which is engageable with operating pawl pin 103. As shown in Fig. 14, free chain ring 82 is provided with generally opposite cam shoulders 108 and 109 which are engageable with holding pawl pin 102 and operating pawl pin 103 respectively, also in a manner to be described.

*Operation of the hoist*

Operation of the hoist to effect load raising or lowering or to provide free chain is a simple matter governed by the position of the single control lever 86 irrespective of and independent of the position of operating handle 6 relative to the hoist casing. To raise the load, control lever 86 is moved to the uppermost or up chain position shown in Fig. 15 (also note Fig. 4) so that the free chain ring 81 and reverse ring 82 are moved clockwise to the position illustrated in Fig. 15. With the rings in such position, pawl pins 102 and 103 are engaged with the generally circular peripheral portions of the respective rings. That is, cam shoulder 106 and stop shoulder 107 of reverse ring 81 and the respective cam shoulders 108 and 109 of free chain ring 82 are completely disengaged from the respective pawls 53 and 54. That is, the control rings are generally inoperative and the pawls 53 and 54 are let into engagement with the ratchet teeth and the load on the hoist is maintained stationary.

As a result, when operating handle 6 is moved through a predetermined arc of approximately 60° in a clockwise direction, sliding cam member 78 effects attendant rotation of ratchet plates 61 and 62 also in a clockwise direction and operating pawl 54 rides over the teeth of ratchet wheel 34. When operating pawl 54 is thus moved, the load is held by holding pawl 53. When operating handle 6 is in its extreme clockwise position and force is applied thereto in a counterclockwise direction, the load is taken by operating pawl 54 and the load may be raised by forcibly rotating ratchet wheel 34 and sheave 36 in the counterclockwise direction. It is during such forcible movement that the mechanical advantage produced by the sliding cam arrangement is brought into play. During the latter movement, holding pawl 53 rides over the ratchet teeth until the load is again taken thereby upon the operator letting up on the operating handle. By repeating such operation, that is by again oscillating operating handle 6 through a given arc, operating pawl 54 is alternately employed to take the load and to raise the same in step by step fashion.

To lower the load, control lever 86 is moved to the central or down chain position shown in Fig. 16 which automatically moves the control rings in a counterclockwise direction to the position shown in such figure. Although as noted previously, holding pawl 53 normally is urged into ratchet wheel engagement by coil spring 57 attached thereto, coil spring 93 which is attached to reverse ring 81 has greater strength than spring 57 so that holding pawl 53, when the same is not sustaining the load, can be kicked or urged out of engagement with the ratchet wheel and held out of such engagement by cam shoulder 106 of the reverse ring as shown in solid lines in Fig. 16. When holding pawl is thus held out, operating pawl 54 has taken the load. However, if holding pawl 53 is sustaining the load, spring 93 is not sufficiently strong to cause disengagement of the pawl from the ratchet wheel and there is no danger of dropping the load.

Holding pawl reengagement may be produced by overcoming the effects of spring 93 by forcibly moving the reverse ring in a clockwise direction so that cam shoulder 106 thereof is disengaged from holding pawl pin 102 and spring 57 can urge pawl 53 into engagement with the ratchet wheel.

Such clockwise movement of reverse ring 81 may be effected by oscillating operating handle 6 and ratchet plates 61 and 62 therewith in the clockwise direction. As noted previously, operating pawl 54 is mounted between ratchet plates 61 and 62 and includes a pawl pin 103 which normally contacts the periphery of the reverse ring 81. As a result, if pawl 54 is moved clockwise from the lowermost position of Fig. 16 to the uppermost position thereof, after first having been moved counterclockwise slightly to take the load from holding pawl 53, pawl pin 103 will strike stop shoulder 107 of the reverse ring and can be employed to forcibly move such reverse ring in a clockwise direction. In so doing, holding pawl pin 102 is freed of engagement with cam shoulder 106 of the reverse ring and the holding pawl is drawn by spring 57 into engagement with the ratchet wheel so that the holding pawl can take the load. Reengagement of the holding pawl is facilitated because the handle tends to rotate clockwise due to the gravity effect of the load.

After the load has thus been taken by reengaged holding pawl 53, operating pawl 54 is freed of the load and may be disengaged from the ratchet wheel so that the same may be moved counterclockwise for subsequently engaging an adjacent tooth of the ratchet wheel. Such disengagement of pawl 54 from the ratchet wheel after the load has been taken by reengaged holding pawl 53 is effected by stop shoulder 107 of the spring loaded reverse ring 81 kicking out pawl 54. Incidental to such disengagement is the fact that clockwise movement of the operating pawl results in pawl pin 103 riding over cam shoulder 109 of the free chain ring to insure that pawl 54 will not become reengaged with the same ratchet tooth when the operating pawl is again moved counterclockwise. Counterclockwise movement of the operating pawl will result in the load being taken by the operating pawl which will permit the reverse ring to move again in a counterclockwise direction with resultant kickout of the holding pawl by cam shoulder 106 as described previously. As a result, upon continued oscillation of the operating handle, holding pawl 53 and operating pawl 54 may alternately be employed to sustain the load so that the load may be lowered in step by step fashion.

To achieve free chaining, as when it is desired to run the chain rapidly and without opposition through the hoist so that the hook thereon may be easily engaged with a load, it is simply necessary to move control lever 86 to the lowermost or free chain position as shown in Fig. 17. Movement of the control lever, as noted previously is accompanied by counterclockwise movement of the free chain ring to the extreme position shown in Fig. 17. However, such free chain ring movement is not accompanied by reverse ring movement in that limit stop 99 on the reverse ring is engaged with the limit stop 101 on the hoist casing. As a result, stop shoulder 107 on the reverse ring is maintained out of engagement with operating pawl pin 103 and cannot interfere with obtaining free chain.

If no load is on the chain, movement of the free chain ring as described brings cam shoulder 108 thereof into engagement with holding pawl pin 102 and cam shoulder 109 thereof into engagement with operating pawl pin 103. The urging effect of spring 94 overcomes the effect of springs 57 and 72 under no load condition to cause the pawl pins to ride over the free chain ring cam shoulders and to be held thereby out of engagement with the teeth of the ratchet wheel. In this manner, the ratchet wheel is free to rotate in either direction in that no restraining pawls are engaged therewith, and as a result the chain may be run freely over the sheave through the hoist in either direction to any extent desired.

However, an important safety feature is automatically built into the hoist in that movement of the control lever 86 to the free chain position is ineffective to produce free chain if the chain sheave is under load in that cam shoulder 108 of the free chain ring cannot kick out the holding pawl if the same is sustaining the load because the spring 94 urging the free chain ring in the counterclockwise direction is not sufficiently strong to overcome the holding effect of the pawl when under load. Furthermore, when the ratchet plates 61 and 62 are rotated clockwise under load conditions, even if an attempt is made to move the free chain ring to the free chain position, engagement of the operating pawl with the ratchet wheel is maintained so that the operating pawl pin 103 will engage cam shoulder 109 but will not ride thereover as is normally true in the free chain condition. Rather the operating pawl pin will engage such shoulder and force the same and the free chain ring in a clockwise direction against the urging effects of springs 93 and 94. As a result, it is not possible for the load to be inadvertently dropped with the present hoist even if the control lever 86 is inadvertently moved to the free chain position. This built-in safety feature is highly important in that safety of the hoist is of prime concern to purchasers thereof. Heretofore the less efficient of several hoists on the market have been chosen by purchasers because the same were safe. That is, generally the trade is more concerned with safety than with efficiency. The present hoist is both efficient and possesses maximum safety features so that the same can be used without fear by the trade.

Referring now to Figs. 6 and 9, it should be noted that the free end of pawl plate 62 is provided with a lower enlarged or bulbous portion limit stop 111. The upper free end also is provided with an enlarged bulbous limit stop 112. Such lower and upper limit stops preclude oscillation of the ratchet plates beyond predetermined limits. Lower limit stop 111 is engageable with the bottom of the casing (as shown in Fig. 6 and in one series of dotted lines in Fig. 9) while the upper limit stop 112 is engageable with cooperating limit stop projection 113 formed in the casing (as shown in Fig. 6 and in the upper dotted line of Fig. 9). As a result, the ratchet plates are oscillatable through an arc defined by engagement of the limit stops with the casing.

Comparing the schematic dotted line showings of Fig. 9, it is noted that ratchet plate oscillation is of the order of approximately 30° which is produced by oscillating the operating handle 6 through an angle of approximately 60°. The sliding cam member 78 which provides the mechanical advantage and connection in the hoist is the compensating factor which allows a 60° arc of the operating handle to be correlated with a 30° arc of the ratchet plates so that the operating mechanism may be confined within a compact hoist housing.

Fig. 12 illustrates a sheave shaft of the type intended to be used with coil chain. Such a shaft may be interchangeably positioned in the hoist merely be removing ratchet plate 61 and removing the roller chain sheave shaft positioned therein as shown in Fig. 8. Because no cotter pins or split rings are employed to hold the shaft in place, interchanging of sheave shafts is a simple matter. Furthermore, a hoist may be modified to use any one of several type chains or cables without requiring modification of the control structure or other mechanism of the hoist. The fact that sheaves may be interchanged is important in that it lets the hoist owner employ whichever type and size chain or cable he deems desirable.

As shown in Figs. 1, 7 and 8, desirably a series of positioning pins 116 which extend from face 5 of hoist section 1 are engageable in a cooperable series of positioning bores 117 in the cap section of the housing 2 so that the housing sections may be engaged properly before cap screws 3 are secured in place.

From the foregoing it should be understood that an extremely safe and compact, yet strong and light weight, hoist is provided by the present invention which is capable of lifting loads in excess of those liftable by prior art devices of comparable size. Furthermore, because of the compactness of the housing, the same is imparted with an attractive configuration which is extremely desirable. An attractive, safe and efficient hoist is provided which is highly effective in raising, lowering or obtaining free chain in response to positioning of a single control lever without the need for relying on auxiliary control levers or requiring the operating handle to be located in a given position before free chain or the like may be obtained.

While one desirable embodiment of the invention has been described, modifications thereof which may be apparent to a person skilled in the art should be considered as part of this invention and the same should be interpreted in light of the appended claims.

I claim:

1. In a load bearing hoist comprising pawl and ratchet mechanism in a casing of said hoist operative to effect raising or lowering of a load in a predetermined controlled manner, oscillatable operating handle structure operatively connected with said mechanism whereby the position of a load relative to said hoist may be modified upon oscillation of said structure, said structure including a multi-point star socket member and a force applying handle having a multi-point projection engaged with said socket member, said handle being usable in many positions greater than two relative to said hoist casings so that said handle may be conveniently located for grasping and oscillation by a hoist operator irrespective of the orientation of the hoist, modification of the position of said handle relative to said hoist casing being effected by disengaging said handle projection from said socket member and thereafter reengaging said projection with the points thereof reoriented relative to the points of said socket member, and means for retaining said handle projection normally engaged with said socket member.

2. A hoist of the type defined in claim 1 wherein said retaining means includes a spring element which normally urges said handle projection into engagement with said socket member, the urging effect of said spring being overcomable to permit disengagement of said projection from said socket member whereby the position of said handle may be changed.

3. A hoist of the type defined in claim 1 wherein said retaining means includes a fastener removably engaged with said handle and with said socket member, said fastener normally holding said handle positively engaged with said socket member but permitting disengagement thereof upon its removal.

4. In a load bearing hoist which includes mechanism for raising and lowering a load supported on a chain type element extending from said hoist in a predetermined controlled manner in response to movement of an operating handle which is operatively connected with said mechanism, control structure for regulating operation of said mechanism, said control structure including a single control member operatively connected with said mechanism the position of which determines the direction and manner in which said chain type element moves in response to movement of said operating handle whereby up, down or free chain is obtainable by positioning said control member in a predetermined up, down or free chain position, said control member in regulating said mechanism being effective independently of and irrespective of the position of said operating handle.

5. In a hoist including pawl and ratchet mechanism, control structure for regulating operation of such mechanism and controlling the direction and manner of movement of a load supporting chain engaged with said mechanism, said control structure comprising a single control lever and at least one control ring operatively engaged with said pawl and ratchet mechanism, said single control lever being operatively engaged with said control ring so that the position of said single control lever regulates the position of said control ring whereby up, down or free chain control may be obtained solely by positioning said lever in a predetermined up, down or free chain position.

6. A handle operated pawl and ratchet type chain hoist in which up, down and free chain control is incorporated in a single control member, said hoist including pawl and ratchet mechanism effective to raise or lower a load in a predetermined manner in response to location of said control member in a predetermined position and operation of the hoist handle, said control member being operatively connected with said mechanism and controlling operation of the same independently of auxiliary control levers whereby up, down and free chain control is obtainable irrespective of the position of the hoist operating handle.

7. In a load bearing hoist which includes mechanism comprising pawl means and ratchet means for raising and lowering in a predetermined controlled manner a load supported on a chain type element engaged with said mechanism, an oscillatable operating handle operatively connected with said mechanism, and control structure for regulating operation of said mechanism so that up, down and free chain control may be obtained independently of and irrespective of the position of said operating handle, said control structure including a pair of control rings operative to regulate engagement of said pawl means with said ratchet means whereby up, down or free chain is determined by the respective positions of said control rings relative to said pawl means and said ratchet means, and a single control lever operatively connected with said control rings so that movement of said control lever to a given position effects movement of said control rings to given positions whereby desired up, down or free chain control may be obtained solely by locating said single control lever in such given position.

8. Operating structure for effecting rotation about an axis of a shaft on which a chain engaging sheave of a load bearing hoist is mounted comprising an operating handle oscillatable through a given arc about another axis, and mechanical advantage producing means operatively connecting said operating handle with said shaft whereby oscillation of said handle produces rotation of said shaft in a given direction, said means including a sliding cam member reciprocably positioned between said handle and said shaft, oscillation of said handle about said last mentioned axis effecting sliding reciprocation of said cam member and attendant rotation of said shaft about said first mentioned axis.

9. A chain type load bearing device comprising a housing, a shaft rotatable in said housing, a chain sheave and a ratchet wheel on said shaft and non-rotatable relative thereto, a ratchet plate rotatably mounted on said shaft, pawl means mounted on said ratchet plate and engageable with said ratchet wheel for regulating rotation of said shaft and said sheave thereon, a cam member slidably engaged with said ratchet plate and reciprocable in a generally radial direction relative to the axis of said shaft, an operating handle oscillatable about another axis spaced from said shaft axis, said operating handle being operatively connected with said cam member whereby oscillation of said handle effects reciprocation of said cam member with attendant rotation of said ratchet plate whereby engagement of said pawl means with said ratchet wheel may be altered or attendant rotation of said ratchet wheel may be effected depending upon the direction of oscillation of said handle, said cam member reciprocating entirely within an arc defined by rotation of said ratchet plate, a load raising or lowering mechanical advantage being produced thereby in the absence of gears and compression links.

10. A chain hoist comprising a rotatable shaft having a ratchet wheel and a chain sheave thereon which are non-rotatable relative thereto, a holding pawl and an operating pawl engageable with said ratchet wheel in predetermined arrangement for regulating rotation of said shaft and movement of a chain passing over said sheave, a ratchet plate rotatably mounted on said shaft, said operating pawl being mounted on said ratchet plate for movement therewith whereby rotation of said ratchet plate alters engagement of said operating pawl with said ratchet wheel or produces attendant rotation of said ratchet wheel depending upon the direction of rotation of said ratchet plate, an operating handle oscillatable about an axis distinct from the axis of said shaft, and means operatively connecting said operating handle with said ratchet plate whereby movement of said handle produces attendant movement of said operating pawl, said connecting means comprising a cam member slidably mounted on said ratchet plate and an operating pin connected with said operating handle and engaged with said cam member, rotation of said handle effecting movement of said operating pin relative to said shaft axis whereby sliding reciprocation of said cam member and rotation of said ratchet plate are effected, said cam member reciprocating entirely within the arc defined by rotation of said ratchet plate whereby an operating mechanical advantage is produced between said operating handle and said ratchet wheel in the absence of gears or compression links.

11. A hoist combination comprising a multi-position operating handle including a polygonal handle projection and a multi-point star socket member cooperable with said handle projection, pawl and ratchet mechanism for effecting raising or lowering of a load in a predetermined controlled manner including a chain sheave easily removable from said hoist whereby a sheave of a different character may be substituted therefor so that chains of various sizes and types may be employed with said hoist, and control structure operatively connected with said pawl and ratchet mechanism for regulating operation of said mechanism, said control structure including a single control lever the position of which regulates up, down and free chain control irrespective of the position of said operating handle.

12. A handle operated hoist comprising a casing, operating handle structure mounted on said casing, and operating mechanism and control structure positioned substantially within said casing; said operating mechanism including a rotatable shaft, a ratchet wheel on said shaft, and a load bearing sheave on said shaft over which a chain is passable, a pair of spring loaded pawls normally urged into engagement with said ratchet wheel for precluding rotation of said sheave in one direction whereby a load may be supported on said chain; said control structure regulating engagement of said pawls with said ratchet wheel whereby such load may be raised or lowered in a predetermined controlled manner in response to oscillation of said operating handle, said control structure comprising a pair of control rings rotatably mounted on said shaft adjacent said ratchet wheel, and a single control lever operatively connected with said rings whereby movement of said lever to a given position produces attendant movement of one or both of said rings, said rings being engageable with said pawls whereby said pawls may be held out of engagement or let into engagement with said ratchet wheel in response to movement of said rings whereby up, down and free chain control are incorporated in said single control lever; one of said pawls being pivotally mounted on a ratchet plate rotatably mounted on said shaft, and a sliding cam member reciprocably mounted on said ratchet plate, the handle of said operating handle structure being oscillatable exteriorly of said casing and engaged with a disc member mounted in a casing wall, said disc member being rotatable about an axis spaced from the axis of said sheave shaft, said disc member including a pin offset from said disc member axis and operatively engaged with said sliding cam whereby oscillation of said operating handle produces sliding reciprocation of said cam member and attendant oscillation of said ratchet plate and said one pawl about said shaft, the extent of said cam member reciprocation being confined within the arc defined by oscillation of said ratchet plate so that an operating mechanical advantage is produced in the absence of gears or compression links whereby a load may be raised or lowered in a controlled manner with minimum effort by a hoist operator.

13. In combination with a pawl and ratchet hoist comprising a ratchet wheel and a pair of pawls normally engaged with said wheel, control structure in which up, down and free chain control are incorporated in a single control lever, said control structure including a pair of control rings, one of said rings having cam surfaces thereon engageable with said pawls for holding the same simultaneously out of engagement with said ratchet wheel whereby said ratchet wheel may rotate freely, the other of said rings having cam surfaces thereon for periodically and selectively disengaging said pawls from said ratchet wheel whereby said ratchet wheel may be rotated in step fashion, and a single control lever operatively connected with said rings for controlling the position of said cam surfaces relative to said pawls whereby up, down and free chain control are obtainable solely by moving said control lever to a predetermined up, down or free chain position.

14. Control structure for a pawl and ratchet type hoist operatively connected with pawl and ratchet load lowering and raising mechanism of said hoist, said control structure comprising a control lever, a link connected with said lever, said link being spring loaded and including a camming pin thereon, and control ring means operatively engaged with the pawls of said mechanism, said control ring means being operatively engaged with said link camming pin and being directly connected by means of resilient connectors to said link whereby said ring means is movable in response to movement of said link, said ring means including cam surfaces selectively engageable with the pawls of said mechanism upon movement of said control lever in a predetermined manner whereby up, down and free chain are obtainable solely by positioning said control lever in a predetermined up, down or free chain position.

15. In a hoist, first and second spring urged control rings engageable with a pair of spring loaded pawls normally engaged with a ratchet wheel for controlling movement in a predetermined manner of a load bearing sheave which is operatively connected with said ratchet wheel, said first ring including spaced cam shoulders engageable with said pawls in a predetermined position of said one ring and being effective under the no load condition of the hoist to move and hold both said pawls out of engagement with said ratchet wheel, said second ring including a cam shoulder engageable with one of said pawls in a predetermined position of said second ring and being effective when no load is sustained by said one pawl to move and hold said one pawl out of engagement with said ratchet wheel, said second ring also including a stop shoulder engageable by the other of said pawls when said other pawl is moved to a given position whereby continued movement of said other pawl is effective to produce rotation of said second ring relative to said one pawl and to move said second ring cam shoulder out of engagement with said one pawl so that said one pawl may reengage said ratchet wheel.

16. A load sustaining chain hoist comprising in combination a casing, operating mechanism in said casing including means for producing a mechanical advantage, operating handle structure operatively connected with said mechanism, and control structure operatively engaged with said mechanism for regulating operation of the same; said mechanism comprising a rotatable chain sheave interconnected with a ratchet wheel for rotation therewith about an axis, a pair of pawls normally engaged with said ratchet wheel for controlling rotation thereof, one of said pawls being pivotally mounted on ratchet plate structure which is rotatable relative to said ratchet wheel, and a sliding cam reciprocably mounted on said ratchet plate structure for movement in a generally radial direction relative to said axis upon rotation of said ratchet plate structure relative to said ratchet wheel; said handle structure including an oscillatable handle positioned externally of said casing for reciprocable rotation relative thereto, and a rotatable disc member mounted on said casing and engaged with said handle and rotatably oscillatable thereby, said disc member being operatively connected with said sliding cam so that oscillation of said handle in a given direction produces rotation of said ratchet plate structure through said sliding cam whereby engagement of said one pawl on said ratchet plate structure relative to said ratchet wheel may be modified or rotation of said ratchet wheel may be effected depending upon the direction in which said handle is oscillated; said control mechanism comprising a pair of spring urged control rings which are rotatable relative to said ratchet wheel and selectively engageable with said pawls, and a single control lever operatively connected with said pair of control rings for controlling engagement thereof with said pawls whereby up, down and free chain condition may be obtained solely by positioning said single control lever in a predetermined up, down or free chain position, one of said control rings having cam surfaces thereon simultaneously engageable with both said pawls for holding the same out of engagement with said ratchet wheel when said control lever is in the free chain position, the other of said control rings having cam surfaces thereon engageable with said pawls for periodically and selectively disengaging said pawls from said ratchet wheel when said control lever is in the up chain or down chain position in response to oscillation of said handle relative to said casing.

17. The hoist of claim 16 wherein the handle of said handle structure is adjustably connected with said disc member by interengaged means which permit disengagement of said handle and disc member so that said handle may be oriented in any one of many positions greater than two relative to said casing whereby said handle may be conveniently located in a predetermined position for positive grasping and oscillation by an operator of said hoist irrespective of the orientation of said hoist.

18. In combination with a handle operated chain type load bearing device including a chain sheave rotatable about an axis over which a load supporting chain is passable and structure operatively connected between the hoist handle and said sheave for regulating rotation of said sheave in a predetermined controlled manner in response to movement of said handle; means free of gears and compression links for imparting a mechanical advantage to the operative connection between said handle and said structure whereby a handle of minimum length and minimum physical effort by an operator of said device are effective to raise a load, said mechanical advantage producing means comprising a cam member slidably and reciprocably engaged with said structure for effecting rotation of said chain sheave upon reciprocation thereof, an oscillatable disc member pivotally mounted adjacent said cam member, and a pin operatively connecting said disc member with said cam member, rotary oscillation of said disc member relative to said axis producing oscillation of said cam member in a generally radial direction relative to said axis, said disc member being operatively connected with said handle whereby oscillation of said handle in a given direction produces oscillation of said cam member and attendant rotation of said chain sheave.

19. In combination with a load bearing device having a casing and mechanism in said casing operative to regulate raising or lowering of a load in a predetermined controlled manner, a movable multi-position adjustable operating handle located outside said casing, and means operatively connecting said handle with said mechanism whereby the position of a load supported by said device may be modified upon movement of said handle, said means comprising selectively interengageable and disengageable projection and socket structure, said handle being positively operatively engageable with said mechanism in one of many predetermined positions greater than two so that said handle may be conveniently located relative to said casing for grasping and movement by an operator of said device irrespective of the orientation of said device, modification of the operative location of said handle relative to said casing being effectable by disengaging the projection and socket of said structure from each other and thereafter re-engaging said projection and socket in reoriented fashion, and means for maintaining said projection and socket of said structure normally positively engaged in a predetermined one of said many positions.

20. The combination of claim 19 in which said structure comprises a boss adjacent one end of said handle from which extends a multi-point polygonal projection and a multi-point star socket member interposed between said boss and said mechanism in which said polygonal projection is selectively engageable.

21. In combination with a handle operated chain type load bearing device which includes a rotatable chain sheave over which a load bearing chain is passed, and pawl and ratchet structure operatively connected between the handle of said device and said sheave for regulating rotation of said sheave in a positive controlled manner in response to movement of said handle; means for imparting a mechanical advantage to the operative connection between said handle and said structure whereby a handle of minimum length and minimum physical effort by an operator of said device may be employed to move a load supported on said chain, said mechanical advantage producing means comprising a cam member movably and reciprocably engaged with said structure whereby rotation of said chain sheave in a predetermined direction may be effected upon movement of said cam member in a predetermined direction, and oscillatable means interposed between said handle and said cam member operatively interengaging the same so that movement of said handle in a predetermined direction produces attendant movement of said cam member in a predetermined direction.

22. In a pawl and ratchet type hoist comprising a rotatable shaft on which is mounted a ratchet wheel and a chain sheave, and a pair of spring loaded pawls normally engaged with said wheel for precluding rotation of said shaft and said sheave; control structure for regulating engagement of said pawls with said wheel comprising a pair of control rings each of which has cam surfaces thereon selectively engageable with said pawls for selectively precluding or permitting engagement of said pawls with said wheel so that rotation of said shaft in step fashion may be permitted or precluded, a single control member operatively engageable with said rings for selectively regulating engagement of said cam surfaces with said pawls, and operating handle structure operatively connected with said shaft for effecting rotation thereof when said handle structure is moved in a given direction so that a load supported by said hoist may be raised or lowered in a controlled manner.

References Cited in the file of this patent
UNITED STATES PATENTS

| 2,741,927 | Hollander | Apr. 17, 1956 |
| 2,789,791 | Carroll | Apr. 23, 1957 |